United States Patent

[11] 3,634,152

| [72] | Inventors | Takeru Yanagisawa<br>Tokyo;<br>Yoshikyo Mega, Himeji-shi, both of Japan |
|---|---|---|
| [21] | Appl. No. | 856,178 |
| [22] | Filed | Sept. 8, 1969 |
| [45] | Patented | Jan. 11, 1972 |
| [73] | Assignee | Kawase Bussan Kabushiki Kaisha<br>Tokyo, Japan |

[54] MATCH HEAD COMPOSITION
4 Claims, No Drawings

[52] U.S. Cl. ........................................ 149/18,
44/42, 149/77, 149/82, 149/84
[51] Int. Cl. .......................................... C06f 3/00
[50] Field of Search ............................................ 44/42;
149/18, 77, 82, 84

[56] References Cited
UNITED STATES PATENTS

| 340,747 | 4/1886 | Weibach | 44/42 |
|---|---|---|---|
| 676,874 | 6/1901 | Budde | 44/42 |
| 1,406,176 | 2/1922 | Fairburn | 44/42 |
| 2,568,285 | 9/1951 | Knutsson-Hall | 44/42 X |

*Primary Examiner*—Daniel E. Wyman
*Assistant Examiner*—C. F. Dees
*Attorney*—Marshall & Yeasting

ABSTRACT: A composition which is applied to the end of a match stick comprises shellac, sulphur, barium chlorate, diatomaceous earth, glue and polyvinyl chloride.

MATCH HEAD COMPOSITION

BACKGROUND OF THE INVENTION

There is a need for an improved composition which can be used to form a head on a match stick which is suitable for use in mass production to produce a safety match for practical use.

SUMMARY OF THE INVENTION

The present invention relates to a composition for producing a match head which burns with a green flame.

One object of this invention is to obtain stable combustibility and flame effect of the match by using finely pulverized (smaller than the particle size of 120 mesh) barium chlorate as a flame-coloring agent and an oxidizing agent, together with shellac, and sulfur as a fuel, and moreover by using diatomaceous earth (particle size of 120–200 mesh) as an inhibitor.

Another object of this invention is to increase the flame-coloring effect by the addition of an organic chloride, for example, 2 percent of polyvinyl chloride powder, to the said composition.

Specifically, this invention is characterized by the preparation of a match head composition by the admixture of the following: 10–15 percent by weight of shellac, 3–5 percent sulfur as a fuel, 5–8 percent of diatomaceous earth having a particle size of 120–200 mesh as an inhibitor, and 60–80 percent of barium chlorate as an oxidizing agent and a flame-coloring agent for producing a green flame, with a glue solution.

DESCRIPTION OF THE PREFERRED EMBODIMENT

EXAMPLE

| | | |
|---|---|---|
| Barium chlorate | 120 mesh | 76 % |
| Shellac | 120 mesh | 11 % |
| Sulphur | 120 mesh | 4 % |
| Diatomaceous earth | 150 mesh | 6 % |
| Animal glue | | 3 % |

The above-mentioned components are thoroughly admixed, and the resulting composition is applied to the end of a match stick.

In this case, the proportion of glue may be changed suitably in accordance with the season and the atmospheric temperature.

A match head prepared according to this invention is ignited easily by friction, and the green flame color is remarkable. Furthermore, the match of this invention has no tendency to smoulder and therefore has a high stability of combustion as compared with the conventional match. The ignition sensitivity is superior to that of the conventional match, and the present match is most suitable as an advertising novelty since a beautiful green flame is provided upon ignition.

We claim:

1. A match head composition which burns with a green flame, comprising an intimate mixture of shellac, sulfur as a fuel, diatomaceous earth as an inhibitor, barium chlorate as a green flame-coloring agent and oxidizing agent and polyvinyl chloride for increasing the flame color.

2. A composition as set forth in claim 1 comprising 10–15 percent shellac, 3–5 percent of sulfur, both finer than the particle size of 120 mesh, 5–8 percent of diatomaceous earth within the particle size of 120–200 mesh, 60–80 percent of barium chlorate finer than the particle size of 120 mesh and 2 percent or less of polyvinyl chloride.

3. A composition as set forth in claim 1 wherein the said polyvinyl chloride is vinyl chloride powder.

4. A composition as set forth in claim 1 wherein the particle size of the shellac is less that the particle size of 120 mesh, the sulfur is finer that the particle size of 120 mesh and the barium chlorate is within the particle size of 120–200 mesh.

* * * * *